(12) United States Patent
Allen et al.

(10) Patent No.: US 11,168,986 B2
(45) Date of Patent: Nov. 9, 2021

(54) NAVIGATION SYSTEM AND METHOD

(71) Applicant: Rockwell Collins, Inc., Cedar Rapids, IA (US)

(72) Inventors: Keith M. Allen, Centreville, VA (US); Vladislav Gavrilets, McLean, VA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 271 days.

(21) Appl. No.: 16/274,760

(22) Filed: Feb. 13, 2019

(65) Prior Publication Data

US 2021/0123740 A1    Apr. 29, 2021

(51) Int. Cl.
| G01S 19/33 | (2010.01) |
| G01C 21/20 | (2006.01) |
| G01S 19/47 | (2010.01) |
| G05D 1/10 | (2006.01) |

(52) U.S. Cl.
CPC .............. *G01C 21/20* (2013.01); *G01S 19/33* (2013.01); *G01S 19/47* (2013.01); *G05D 1/101* (2013.01)

(58) Field of Classification Search
CPC ......... G01C 21/20; G01S 19/33; G01S 19/47; G05D 1/101
USPC ............................................................ 701/3
See application file for complete search history.

(56) References Cited

U.S. PATENT DOCUMENTS

| 5,923,286 | A | 7/1999 | Divakaruni |
| 7,219,013 | B1 | 5/2007 | Young et al. |
| 8,160,758 | B2 * | 4/2012 | Call ................... G01S 13/935 701/16 |
| 9,031,717 | B2 * | 5/2015 | Mere ..................... G05D 1/00 701/3 |
| 10,422,872 | B2 * | 9/2019 | Dunik ................... G01S 13/08 |
| 2006/0167619 | A1 | 7/2006 | Arethens |
| 2010/0332122 | A1 | 12/2010 | Weichbrod et al. |
| 2011/0084874 | A1 * | 4/2011 | Coatantiec ............ G01S 19/33 342/357.3 |
| 2012/0296496 | A1 * | 11/2012 | Hedrick ............. G05D 1/0077 701/3 |
| 2014/0292574 | A1 * | 10/2014 | Dunik .................. G01S 19/20 342/357.58 |
| 2015/0219460 | A1 | 8/2015 | Gmerek et al. |

(Continued)

OTHER PUBLICATIONS

Orejas, Martin et al., "Multiconstellation GNSS/INS to Support LPV200 Approaches and Autolanding", GNSS 2012, Proceedings of the 25th International Technical Meeting of the Satellite Division of the Institute of Navigation (ION GNSS 2012), The Institute of Navigation, Sep. 21, 2012 pp. 790-803.

(Continued)

*Primary Examiner* — James M McPherson
(74) *Attorney, Agent, or Firm* — Suiter Swantz pc llo

(57) ABSTRACT

An aircraft, a system, and a method. The aircraft may include a computing device. The computing device may include a processor. The processor may be configured to utilize inertial navigation data, global navigation satellite system (GNSS) measurements, and flight trajectory data to compute navigation data and a predicted horizontal integrity level (HIL). The processor may be further configured to output the navigation data and the predicted HIL to be used for performance of a required navigation performance (RNP) procedure or a preflight planning procedure.

18 Claims, 7 Drawing Sheets

(56) References Cited

U.S. PATENT DOCUMENTS

2017/0068253 A1    3/2017    Hedrick et al.

OTHER PUBLICATIONS

Extended European Search Report dated May 15, 2020 for EP Application No. 20157201.
Young, Ryan S. Y. et al., "Fault Detection and Exclusion Using Normalized Solution Separation and Residual Monitoring Methods", Journal of The Institute of Navigation, vol. 50, No. 3, Fall 2003.

* cited by examiner

NAVIGATION SYSTEM AND METHOD

CROSS-REFERENCE TO RELATED APPLICATIONS

The present application is related to U.S. patent application Ser. No. 10/631,314, filed on Jul. 31, 2003, issued as U.S. Pat. No. 7,219,013 on May 15, 2007, which is hereby expressly incorporated herein in its entirety.

BACKGROUND

Existing global navigation satellite system (GNSS)/inertial reference system (IRS) hybrid systems specify integrity coasting capability assuming worst-case or typical conditions. Existing GNSS/IRS hybrid systems often suffer from inadequate GNSS/IRS integrity solutions in the presence of global positioning system (GPS) outages and receiver autonomous integrity monitoring (RAIM) holes.

Existing aircraft navigation systems calculate a Horizontal Protection Level (HPL), which is a bound on the aircraft's estimated position radius from the true position, for some rate of missed alerts ($P_{MA}$, typically $10^{-7}$/hr). For an aircrew and aircraft to fly a Required Navigation Performance procedure (RNP) using an existing aircraft navigation system, the existing navigation system HPL must be less than the Horizontal Alert Limit (HAL) for that procedure. For existing aircraft navigation systems, the pilot must abort an RNP procedure if either the HPL exceeds the HAL, or if the navigation system issues an integrity alert. These events mean that the existing navigation system does not have confidence that the position error is within the safe RNP boundary.

SUMMARY

In one aspect, embodiments of the inventive concepts disclosed herein are directed to an aircraft. The aircraft may include a computing device. The computing device may include a processor. The processor may be configured to utilize inertial navigation data, global navigation satellite system (GNSS) measurements, and flight trajectory data to compute navigation data and a predicted horizontal integrity level (HIL). The processor may be further configured to output the navigation data and the predicted HIL to be used for performance of a required navigation performance (RNP) procedure or a preflight planning procedure.

In a further aspect, embodiments of the inventive concepts disclosed herein are directed to a system. The system may include a flight management system (FMS) and a computing device. The FMS may include a processor. The computing device may include a processor. The processor of the computing device may be configured to utilize inertial navigation data, global navigation satellite system (GNSS) measurements, and flight trajectory data to compute navigation data and a predicted horizontal integrity level (HIL). The processor of the computing device may be further configured to output, to the FMS, the navigation data and the predicted HIL to be used for performance of a required navigation performance (RNP) procedure or a preflight planning procedure. The FMS may be configured to utilize the navigation data and the predicted HIL to perform the RNP procedure or the preflight planning procedure.

In a further aspect, embodiments of the inventive concepts disclosed herein are directed to a method of operating an aircraft. The method may include utilizing, by a processor, inertial navigation data, global navigation satellite system (GNSS) measurements, and flight trajectory data to compute navigation data and a predicted horizontal integrity level (HIL). The method may further include outputting, by the processor, the navigation data and the predicted HIL. The method may further include, based on the navigation data and the predicted HIL, performing a required navigation performance (RNP) procedure or a preflight planning procedure.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
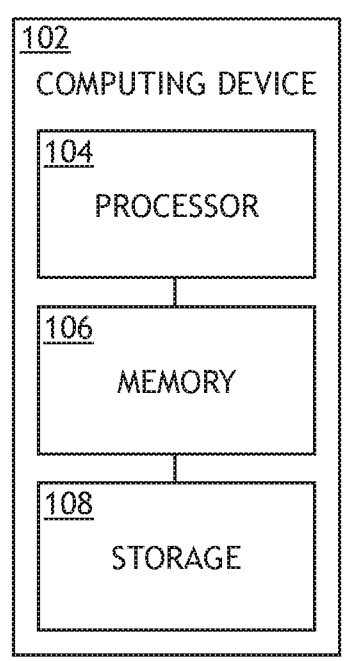
FIG. 1 is a view of an exemplary embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein may be directed to a system including a computing device and a method configured to dynamically predict coasting capability in real time based on current conditions and a planned flight path. This improves accuracy of the prediction and would enable longer coasting because there is less need for conservatism. Consequently, embodiments allow for better availability of a GNSS/IRS integrity solution in the presence of GPS outages and RAIM holes. Embodiments may improve the functioning of an aircraft by allowing longer coasting in the presence of GPS outages and RAIM holes. Embodiments may improve safety in the field of aviation by providing better availability of a GNSS/IRS integrity solution in the presence of GPS outages and RAIM holes.

Embodiments may include a system to predict a future horizontal integrity level (HIL) and time-to-alert (TTA) based on a current state of a navigation filter and a planned flight trajectory. Knowing a predicted future HIL may aid pilot decision making and may allow continuation of flight procedures that currently result in missed approaches. Embodiments may include an improvement to Rockwell Collins' GNSS-Inertial position and integrity solution as disclosed by Ryan Young, *Fault Detection and Exclusion Using Normalized Solution Separation and Residual Monitoring Methods*, Journal of The Institute of Navigation Vol. 50, No. 3, Fall 2003 (hereinafter referred to as "*Fault Detection and Exclusion Using Normalized Solution Separation and Residual Monitoring Methods*"), which is hereby expressly incorporated herein in its entirety.

If the navigation system computes a GPS-inertial hybrid solution, then the system may continue to provide navigation data (e.g., a position estimate) and a HIL after GPS measurements are lost. The hybrid solution may also be used to maintain an HIL<HAL, even when a snapshot RAIM HPL exceeds the HAL due to poor constellation geometry (this situation is referred to as "a RAIM hole"). This usage of the hybrid position and HIL while GPS is lost is called 'integrity coasting'.

While embodiments exemplarily include a navigation system using GPS measurements, some embodiments may include measurements from any GNSS constellation.

As used throughout, receiver autonomous integrity monitoring (RAIM) is an algorithm that may be implemented by a GNSS receiver (e.g., a GPS receiver) that detects and attempts to exclude measurements from a failed satellite. The RAIM algorithm also may compute a protection level that is intended to bound the position error, to some confidence level.

As used throughout, required navigation performance (RNP) is a type of flight procedure that requires a specific level of positioning accuracy from the navigation equipment. RNP procedures are typically tracks through congested airspace or difficult terrain. If the aircraft's navigation equipment is not reporting a protection level that is less than the HAL for the procedure, then the crew is not allowed to fly the RNP procedure.

As used throughout, horizontal alert limit (HAL) is a maximum allowable position error for a specific procedure and/or trajectory.

As used throughout, horizontal protection level (HPL) and horizontal integrity level (HIL) are synonymous. HPL and HIL refer to a radius of a circle that bounds the horizontal position error, given some rate of missed alerts and false alarms, and given the assumed error characteristics. The industry standard term is HPL, and HPL is typically associated with the RAIM algorithm. As used throughout, HIL may be used to differentiate a protection level (i.e., HIL) of a hybrid GNSS-IRS navigation filter from a protection level (i.e., HPL) of a pure-GNSS solution.

Referring now to FIGS. 1-5, exemplary aircraft systems of an aircraft 100 are depicted, where at least one processor of any suitable aircraft equipment may be configured to perform any or all of the operations disclosed throughout, such as operations to dynamically predict coasting capability in real time based on current conditions and a planned flight path. FIGS. 1-5 depict multiple possible installations schemes for equipment configured to perform an algorithm (e.g., an HIL prediction algorithm) as disclosed throughout. For example, embodiments may include any suitable aircraft computing device with access to GNSS measurements, inertial sensor measurements, and flight trajectory data, that may be configured to perform an algorithm (e.g., an HIL prediction algorithm) as disclosed throughout.

Referring now to FIG. 1, an exemplary embodiment of a system according to the inventive concepts disclosed herein includes an aircraft 100. The aircraft 100 may include at least one computing device 102. The computing device 102 may include at least one processor 104, at least one memory 106, and at least one storage device 108, some or all of which may be communicatively coupled at any given time. The processor 104 may be configured to obtain GNSS measurements, inertial sensor measurements, and flight trajectory data and to perform any or all of the operations (e.g., an HIL prediction algorithm) disclosed throughout. The at least one computing device 102 may be implemented as any suitable computing device or any combination of suitable computing devices, such as at least one multi-mode receiver (MMR) (e.g., 114), at least one inertial reference system (IRS) (e.g., 112), at least one flight management system (FMS) (e.g., 116), at least one GNSS receiver (e.g., 120), and/or at least one data concentrator unit (DCU) (e.g., 118).

Figure 2:
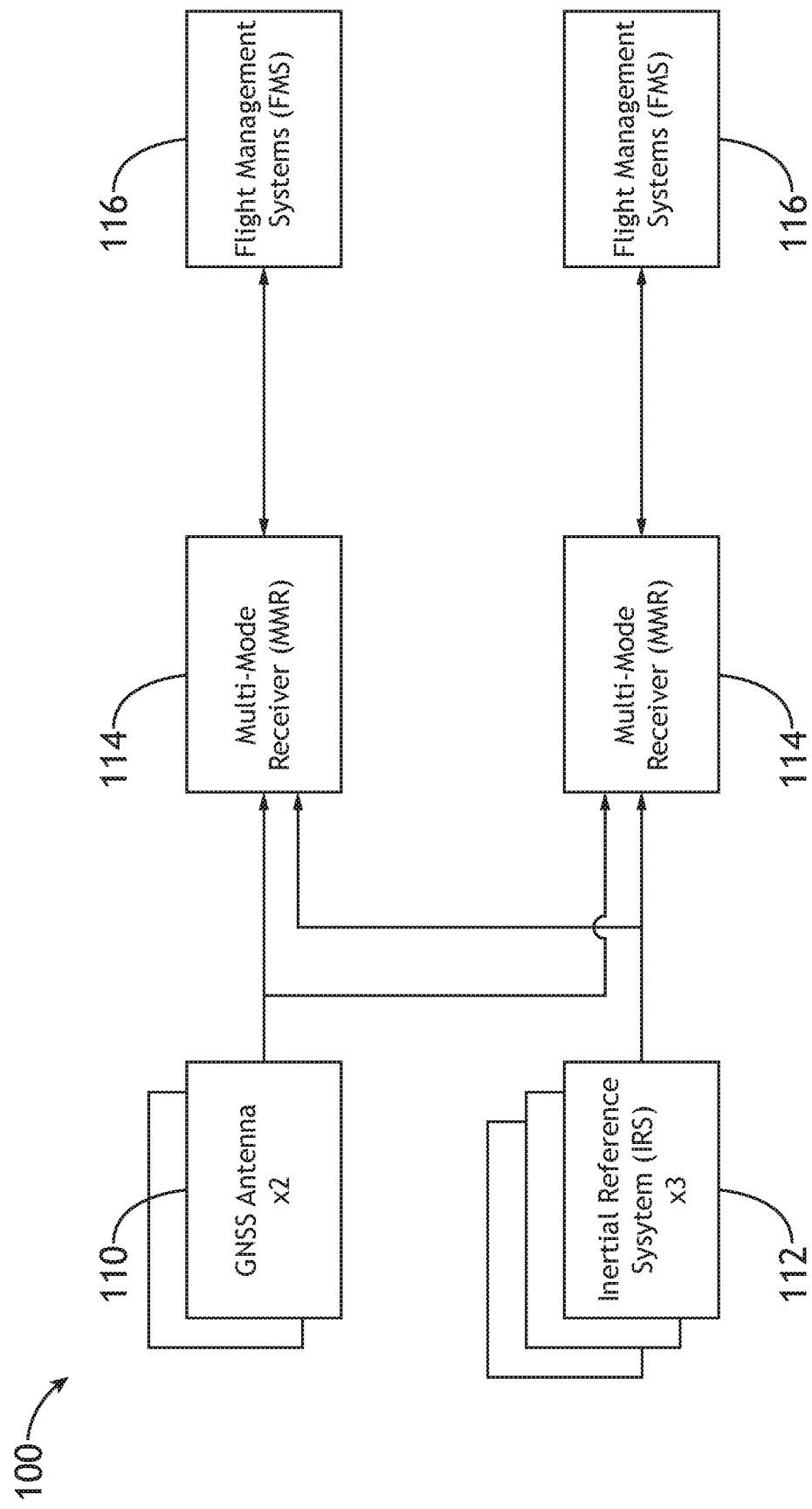
FIG. 2 is a view of an exemplary embodiment of a system according to the inventive concepts disclosed herein.

Referring now to FIG. 2, an exemplary embodiment of a system according to the inventive concepts disclosed herein includes the aircraft 100. The aircraft 100 may include at least one (e.g., two) GNSS antennae 110, at least one (e.g., three) IRS 112, at least one (e.g., two) MMR 114, and at least one (e.g., two) FMS 116, some or all of which may be communicatively coupled at any given time. In addition to being IRSs, MMRs, and FMSs, each of the IRSs 112, the MMRs 114, and the FMSs 116, respectively, may be implemented similarly, have similar components, and have functionality similar to the computing device 102, such that a processor may be configured to perform any or all of the operations (e.g., an HIL prediction algorithm) disclosed throughout. For example, the HIL prediction algorithm may run on at least one of the MMRs 114. Each MMR 114 may receive inertial navigation data from three redundant IRSs 112 and GNSS signals from two redundant GNSS antennae 110. Each MMR 114 may receive flight trajectory data from at least one of the FMSs 116. Each MMR 114 may determine navigation data (e.g., a position estimate) and the predicted HIL and output the navigation data and the predicted HIL back to each FMS 116.

Figure 3:
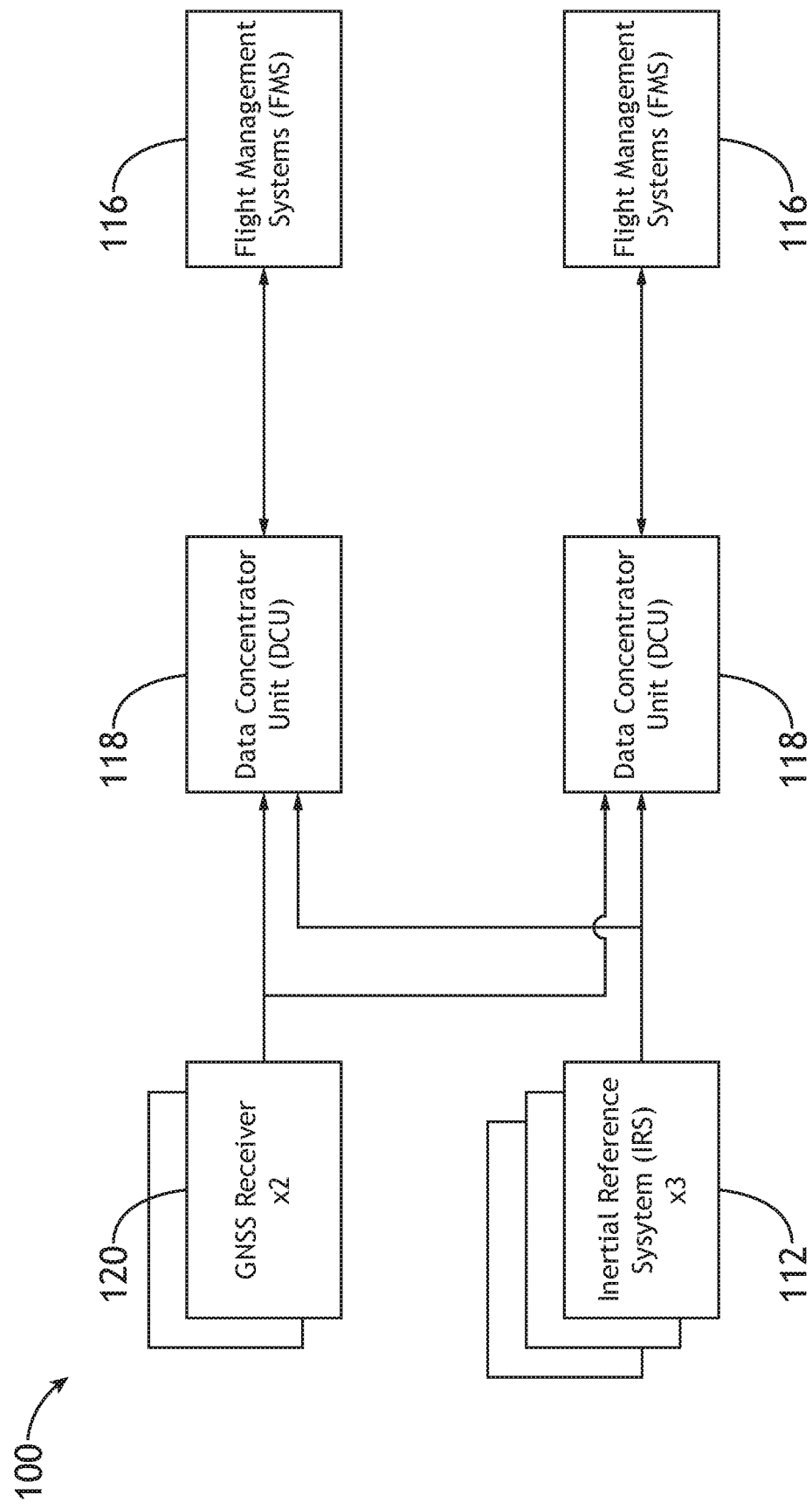
FIG. 3 is a view of an exemplary embodiment of a system according to the inventive concepts disclosed herein.

Referring now to FIG. 3, an exemplary embodiment of a system according to the inventive concepts disclosed herein includes the aircraft 100. The aircraft 100 may include at least one (e.g., two) GNSS receiver 120, at least one (e.g., three) IRS 112, at least one (e.g., two) DCU 118, and at least one (e.g., two) FMS 116, some or all of which may be communicatively coupled at any given time. In addition to being GNSS receivers, IRSs, DCUs, and FMSs, each of the GNSS receivers 120, the IRSs 112, the DCUs 118, and the FMSs 116, respectively, may be implemented similarly, have similar components, and have functionality similar to the computing device 102, such that a processor may be configured to perform any or all of the operations (e.g., an HIL prediction algorithm) disclosed throughout. For example, the HIL prediction algorithm may run on at least one of the DCUs 118. Each DCU 118 may receive inertial navigation data from three redundant IRSs 112 and GNSS measurements from two redundant GNSS receivers 120. Each DCU 118 may receive flight trajectory data from at least one of the FMSs 116. Each DCU 118 may determine navigation data and the predicted HIL and output the navigation data and the predicted HIL back to each FMS 116.

Figure 4:
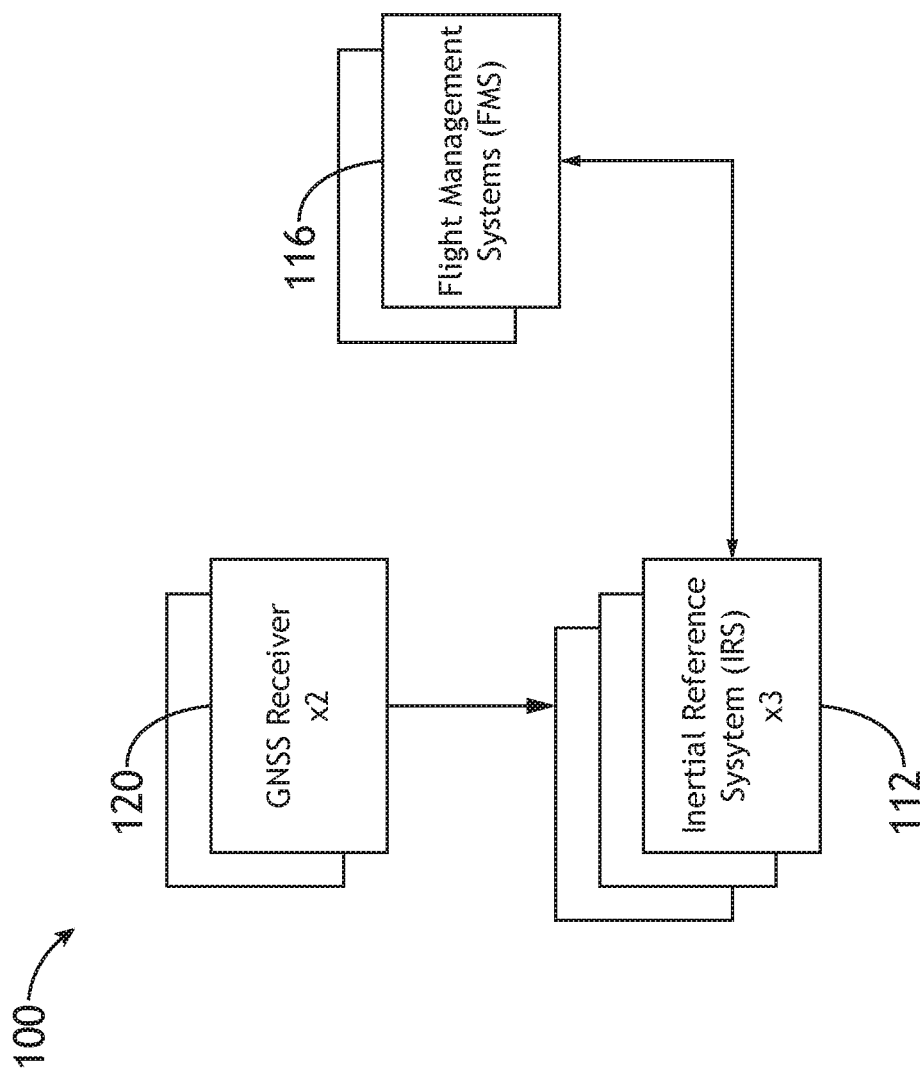
FIG. 4 is a view of an exemplary embodiment of a system according to the inventive concepts disclosed herein.

Referring now to FIG. 4, an exemplary embodiment of a system according to the inventive concepts disclosed herein includes the aircraft 100. The aircraft 100 may include at least one (e.g., two) GNSS receiver 120, at least one (e.g., three) IRS 112, and at least one (e.g., two) FMS 116, some or all of which may be communicatively coupled at any given time. In addition to being GNSS receivers, IRSs, and FMSs, each of the GNSS receivers 120, the IRSs 112, and the FMSs 116, respectively, may be implemented similarly, have similar components, and have functionality similar to the computing device 102, such that a processor may be configured to perform any or all of the operations (e.g., an HIL prediction algorithm) disclosed throughout. For example, the HIL prediction algorithm may run on at least one of the IRSs 112. Each IRS 112 may generate inertial navigation data and may receive GNSS measurements from two redundant GNSS receivers 120. Each IRS 112 may receive flight trajectory data from at least one of the FMSs 116. Each IRS 112 may determine navigation data and the predicted HIL and output the navigation data and the predicted HIL back to each FMS 116.

Figure 5:
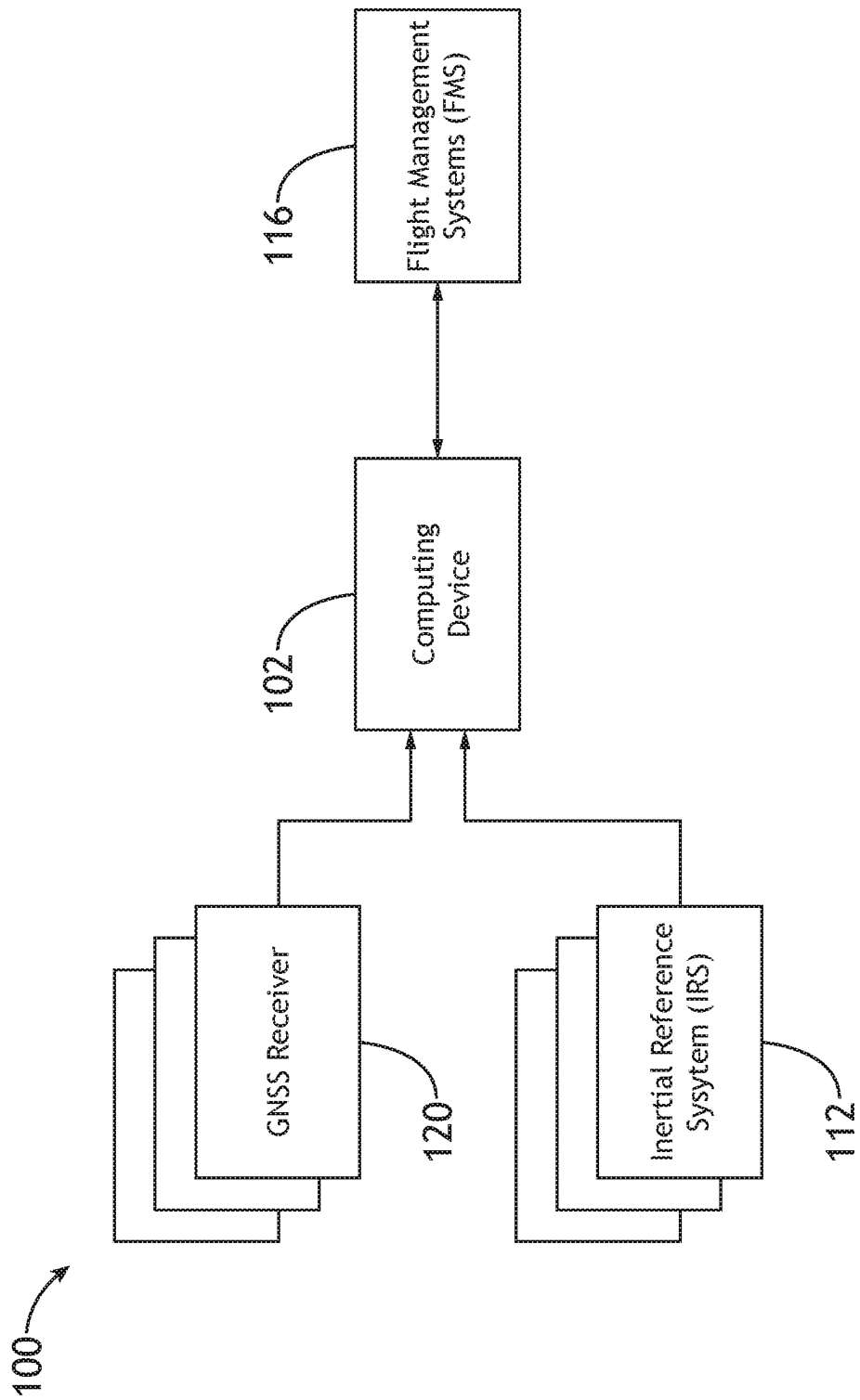
FIG. 5 is a view of an exemplary embodiment of a system according to the inventive concepts disclosed herein.

Referring now to FIG. 5, an exemplary embodiment of a system according to the inventive concepts disclosed herein includes the aircraft 100. The aircraft 100 may include at least one (e.g., two or more) GNSS receiver 120, at least one (e.g., two or more) IRS 112, the computing device 102, and at least one FMS 116, some or all of which may be communicatively coupled at any given time. In addition to being GNSS receivers, IRSs, and the FMS, each of the GNSS receivers 120, the IRSs 112, and the FMS 116, respectively, may be implemented similarly, have similar components, and have functionality similar to the computing device 102, such that a processor may be configured to perform any or all of the operations (e.g., an HIL prediction algorithm) disclosed throughout. For example, the HIL prediction algorithm may run on the computing device 102. The computing device 102 may receive inertial navigation data from any number of redundant IRSs 112 and GNSS measurements from any number of redundant GNSS receivers 120. The computing device 102 may receive flight trajectory data from the FMS 116. The computing device 102 may determine navigation data and the predicted HIL and output the navigation data and the predicted HIL back to the FMS 116.

In some embodiments, a processor (e.g., 104) may utilize data of nominal aircraft attitude along a planned trajectory to compute the predicted HIL. This allows the HIL prediction algorithm to predict which satellites will be masked by a fuselage of the aircraft 100 during flight maneuvers (e.g., a 30-degree banking turn).

In some embodiments, a processor (e.g., 104) may utilize data of topography along a planned flight route to compute the predicted HIL. For example, if the aircraft 100 is flying in a deep valley, the HIL prediction algorithm may take into account which satellites might be masked by terrain.

HIL During Integrity Coasting

The algorithm (e.g., the Collins Autonomous Fault Exclusion (CAFE) algorithm) for a high-integrity GNSS-IRS hybrid position solution is described in *Fault Detection and Exclusion Using Normalized Solution Separation and Residual Monitoring Methods*, which is expressly incorporated herein in its entirety as mentioned above. Embodiments may include at least one processor (e.g., the processor 104 or a similar processor of any suitable aircraft equipment as disclosed above) configured to perform the CAFE algorithm and the HIL prediction algorithm. The CAFE algorithm uses a set of 1-satellite-excluded subfilters to estimate the $H_1$ HIL: the horizontal integrity limit assuming a worst-case undetected single satellite failure. The covariance matrix, $P_0$, of the full filter (0 satellites excluded) is used to calculate the $H_0$ HIL, the integrity limit given a fault-free assumption. The reported system HIL is equal to max($H_0$ HIL, $H_1$ HIL).

When GPS is Available the Position Error Estimate and $P_0$ are Regularly Updated from GPS Measurements. If GPS is Lost, then the Measurement Updates Cease and $P_0$ is Propagated Per the Following Equation:

$$P_{0,k+1} = F_k P_{0,k} F_k^T + Q \qquad \text{Equation 1}$$

$P_{0,k}$ and $P_{0,k+1}$ are the current and next iterations of the covariance matrix. $F_k$ is the current state transition matrix. Q is a fixed matrix of process noise values that model the error characteristics of the inertial navigation sensors. The states of the 1-SV-excluded subfilters are propagated as follows:

$$x_{i,k+1} = F_k x_{i,k} \qquad \text{Equation 2}$$

$x_{i,k}$ is the state of the $i^{th}$ subfilter at iteration k. The time interval between iterations is arbitrary; a typical value is 1 second.

The F matrix defines the linearized propagation of the strapdown navigation errors. F can be computed explicitly based on the following terms of the navigation state:

$v^n$ is a velocity vector $C_b^n$ is a body-to-navigation direction cosine matrix (or quaternion)

$\rho$ is a transport rate vector $\Omega$ is an earth rate vector $f^n$ is a navigation frame acceleration vector During coasting, $P_0$ and x of the full filter are computed to get $H_0$ HIL and a position estimate. $P_i$ and $x_i$ of the 1-SV-excluded subfilters are propagated to get $H_1$ HIL.

HIL Prediction and Time to Alert

Embodiments may include at least one processor (e.g., the processor 104 or a similar processor of any suitable aircraft equipment as disclosed above) configured to perform the HIL prediction algorithm to determine to predict HIL. Performance of the HIL prediction algorithm utilizes navigation information (e.g., CAFE algorithm states and covariance matrices) and flight path information (e.g., 3D waypoints, velocities, and HAL). For a given flight procedure, such as an RNP approach (or any prescribed route), information required to determine the F matrix are known (e.g., nominal values for all terms in the F matrix are known by the processor a priori for the entire approach). Thus, a state transition matrix may be computed for any instant in the approach. Then, given an initial state x and covariance P at the time when GPS is lost, $x_t$ and $P_t$ may be propagated forward and determined, the state/covariance at some future time t along the route. With those values, the future HIL may be computed, so as to predict accurately at what time the HIL will exceed the HAL (time-to-alert).

Predicting HIL along the route is valuable to the pilot for both pre-flight planning and en-route decision making.

For example, the at least one processor may calculate HIL as follows:

1) For each subfilter compute $B_i=P_i(m:n,m:n)-P_0(m:n,m:n)$, $P_i$ is the covariance matrix for subfilter i. $P_0$ is the covariance matrix of the full filter, where elements m:n of the state vector are the elements that correspond to the horizontal position error.

a) Determine the eigenvalues of $B_i$. Let $\sigma_{1,B}$ be the greater eigenvalue and $\sigma_{2,B}$ be the lesser eigenvalue.

b) Determine the eigenvalues of $P_i(m:n,m:n)$. Let $\sigma_1$ be the greater eigenvalue and $\sigma_2$ be the lesser eigenvalue.

c) Compute HPE $B_t$Pbias$\sqrt{\sigma_{1,B_t}}$ where Pbias is the square root of the noncentrality parameter $\wedge$ of the 2-DOF chi-square distribution satisfying the equation:

$$\int_0^{TD^2} f_{NC}(x)dx - P_{MD} = 0$$

and TD is the detection threshold used for the current subfilter. $f_{NC}$ is the noncentral chi-square probability density function in two degrees of freedom. $P_{MD}$ is the rate of missed detection.

d) Compute HPE_NP$_i=K_{cep,i}\sqrt{\sigma_{1,t}}$, where $K_{cep,i}$ is the CEP region radius with probability $(1-P_{MD})$.

e) Compute for the ith subfilter: $HPE_i=HPE\_NP_i + HPE_{bias}$.

2) Compute $HPL_{H1}=\max\{HPE_i\}$, for i=1, . . . , N valid subfilters.

3) Determine the eigenvalues of $P_0(m:n,m:n)$. Let $\sigma_{1,0}$ be the greater eigenvalue and $\sigma_{2,0}$ be the lesser eigenvalue.

4) Compute $HPL_{H0}=K_{cep}\sqrt{\sigma_{1,0}}$ is the CEP region radius with probability $(1-P_{H0})$.

5) Compute $HIL=\max\{HPL_{H0}, HPL_{H1}\}$.

Preflight Planning

At present, when planning a flight with an RNP procedure, flight planning software is executed by a processor to compute the HPL along the route based on a snapshot RAIM algorithm. If there are any points in the route when the predicted HPL exceeds the RNP HAL (e.g., due to poor constellation geometry), then the flight must be delayed and/or re-planned. Such time and/or location points are called "RAIM holes".

Since the GPS hybrid navigation system can provide integrity coasting through GPS outages and RAIM holes and maintain a low HIL using inertial data, embodiments may utilize integrity coasting during preflight planning. Knowing the constellation geometry, at least one processor (e.g., the processor 104 or a similar processor of any suitable aircraft equipment as disclosed above) may predict P at any point based on simulation of the navigation filter algorithm. Then, the processor can propagate P and $H_0$ HIL through any RAIM holes to confirm that the system maintains HIL<HAL. By doing this, the hybrid system mitigates the need to delay a flight if RAIM holes are present.

For example, the at least one processor may be configured to perform the following steps during preflight planning:

1) If a flight plan includes an RNP procedure, predict the time at which the aircraft will be flying the RNP procedure and determine the GNSS satellite geometry during that time (this is done using published satellite ephemeris parameters).

2) Given then flight trajectory and the satellite geometry, simulate the inertial and GNSS measurements along the route and pass them into navigation filter software. Since this step is performed using simulated measurements, the step can be run faster-than-real-time. Running the navigation algorithm will give a covariance matrix P for the full-filter solution, and matrices $P_i$ for subfilters with the $i^{th}$ GNSS measurement excluded.

3) Using the algorithm in *Fault Detection and Exclusion Using Normalized Solution Separation and Residual Monitoring Methods*, estimate the HIL along future points in the route. See section "HIL Prediction and Time to Alert" from above for details.

4) Repeat Steps 1-3 assuming a takeoff time 15 minutes prior to the nominal takeoff time, and 15 minutes after the nominal takeoff time.

5) If HIL remains less than HAL during the RNP procedure, for all takeoff times evaluated, then the flight plan can be executed. This is similar to the status quo, in which $HPL_{RAIM}$ is computed during preflight planning and used to make a go/no-go decision. HIL will always be less than or equal to $HPL_{RAIM}$, so embodiments will allow a higher rate of flights to proceed on time, as planned.

En Route Time to Alert Prediction

Given a navigation system using the CAFE algorithm, and assuming an imminent complete loss of GPS, at least one processor (e.g., the processor 104 or a similar processor of any suitable aircraft equipment as disclosed above) can propagate the full filter/sub-filter solutions into the future along the route using Equation 1 and Equation 2. With those results, the processor can predict future HIL and determine the time/location at which HIL will exceed the RNP HAL, if GPS were lost. A real-time prediction of future HIL based on the current state is more accurate than the preflight prediction, as it can account for dynamic factors such as: satellite failures (e.g., GPS constellation is different than predicted); timing (e.g., aircraft starts approach at different time than predicted); GPS measurement quality is not as predicted (e.g., possibly due to atmospheric effects); and/or flight trajectory up to the current point was not as predicted.

Figure 6:
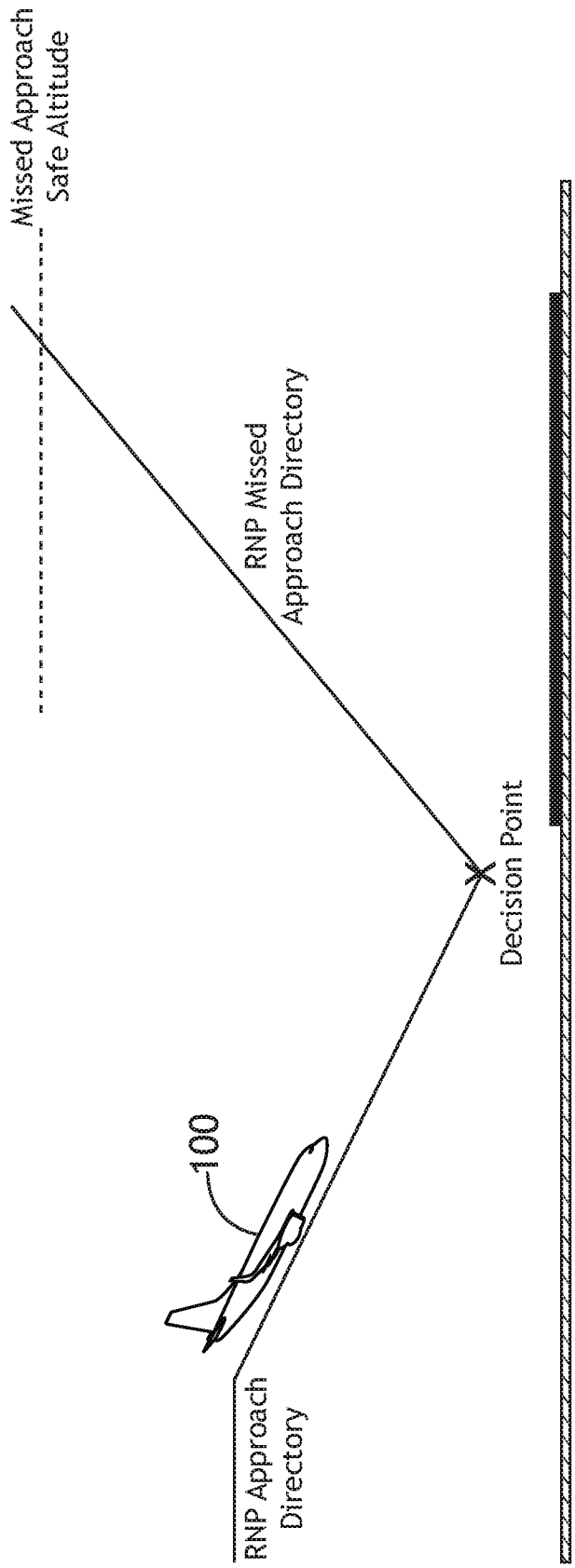
FIG. 6 is a view of an example of RNP approach and missed-approach trajectory according to the inventive concepts disclosed herein.

An inflight calculation of future HIL and the coasting time-to-alert would enable the pilot to make safe decisions in the event of GPS loss. FIG. 6 shows an example RNP approach and missed-approach trajectory. From the aircraft's 100 current location, the processor can predict future HIL along the remainder of the approach to the decision point, and from there up to the safety altitude. If predicted HIL remains below HAL on this entire path, then the pilot knows that they can continue to attempt to land, given an immediate loss of GPS. Even in the worst-case scenario of reaching the decision point and having to go around (e.g., due to a runway obstruction, or visibility being worse than reported by the airport, such that the pilot still can't see the runway at the decision point), the processor executing the algorithm has determined that HIL will be sufficiently low for the remainder of the RNP flight path.

For example, the at least one processor may be configured to perform the following steps during en route mitigation of GPS outages:

1) During flight, a navigation computer continuously computes a position solution using the algorithm in *Fault Detection and Exclusion Using Normalized Solution Separation and Residual Monitoring Methods*. That algorithm gives us the following:

a) x: navigation state error vector b) $P_0$: Covariance matrix of the full-filter solution c) $P_i$: Covariance matrix of the solution with the $i^{th}$ GNSS measurement removed. i=1:N, if we are using N measurements in the full-filter solution 2) The algorithm makes the assumption that a GNSS outage will occur immediately. The algorithm takes the current covariance matrices $P_0$, $P_{i=1:N}$ and propagates them into the future per Equation 1 above. As noted in the text below Equation 1, the state transition matrix F can be computed during preflight planning. F is a function of the known flight trajectory, and the states tracked by the navigation filter. The matrix Q in Equation 1 is a function of the error characteristics of the inertial sensors, and is also a known value.

3) Using the algorithm in *Fault Detection and Exclusion Using Normalized Solution Separation and Residual Monitoring Methods*, estimate the HIL along future points in the route. See section "HIL Prediction and Time to Alert" from above for details.

4) If the estimate HIL along future points in the route remains below HAL for the remainder of the approach procedure, including an aborted approach at the Decision Point and flying the Missed Approach trajectory to the Safety Altitude, then the pilot could safely continue the approach if GNSS service was lost.

Figure 7:
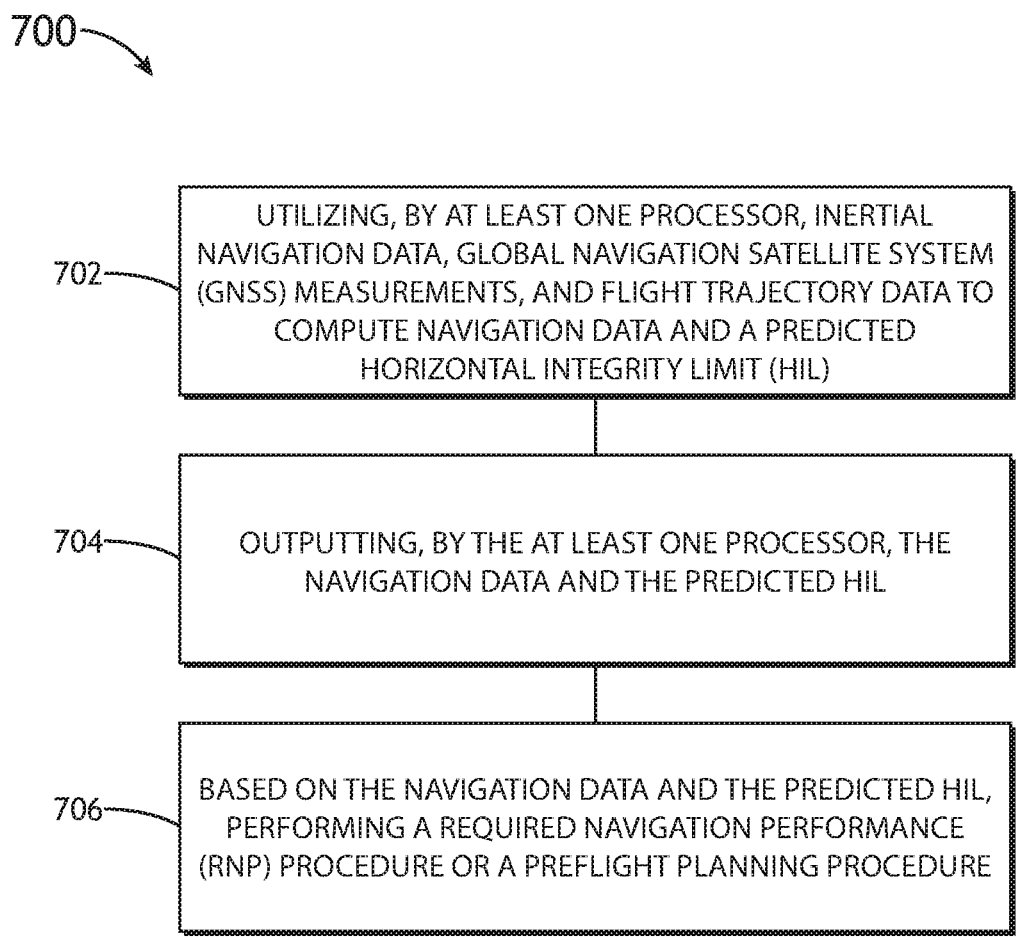
FIG. 7 is a diagram of an exemplary embodiment of a method according to the inventive concepts disclosed herein.

Referring now to FIG. 7, an exemplary embodiment of a method 700 according to the inventive concepts disclosed herein may include one or more of the following steps. Additionally, for example, some embodiments may include performing one more instances of the method 700 iteratively, concurrently, and/or sequentially. Additionally, for example, at least some of the steps of the method 700 may be performed in parallel and/or concurrently. Additionally, in some embodiments, at least some of the steps of the method 700 may be performed non-sequentially.

A step 702 may include utilizing, by at least one processor, inertial navigation data, global navigation satellite system (GNSS) measurements, and flight trajectory data to compute navigation data and a predicted horizontal integrity limit (HIL).

A step 704 may include outputting, by the at least one processor, the navigation data and the predicted HIL.

A step 706 may include based on the navigation data and the predicted HIL, performing a required navigation performance (RNP) procedure or a preflight planning procedure.

Further, the method may include any of the operations disclosed throughout.

As will be appreciated from the above, embodiments of the inventive concepts disclosed herein may be directed to a system, an aircraft, a computing device and method for dynamically predicting coasting capability in real time based on current conditions and a planned flight path.

As used throughout and as would be appreciated by those skilled in the art, "at least one non-transitory computer-readable medium" may refer to as at least one non-transitory computer-readable medium (e.g., memory 106, storage 108, or a combination thereof; e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. An aircraft, comprising:
   a computing device comprising at least one processor, wherein the at least one processor is configured to:
     utilize inertial navigation data, global navigation satellite system (GNSS) measurements, and flight trajectory data to compute navigation data and a predicted horizontal integrity level (HIL), wherein the HIL is a protection level of a hybrid GNSS-inertial reference system (IRS) navigation filter; and
     output the navigation data and the predicted HIL to be used for performance of a required navigation performance (RNP) procedure or a preflight planning procedure,
   wherein the aircraft is configured to integrity coast in the presence of GNSS outages and receiver autonomous integrity monitoring (RAIM) holes,
   wherein if the aircraft is integrity coasting, a covariance matrix ($P_0$) and a state (x) of a full filter having zero satellites excluded are computed to get a horizontal integrity limit given a fault-free assumption ($H_0$ HIL) and a position estimate, wherein a covariance matrix ($P_i$) and a state ($x_i$) of 1-satellite-excluded subfilters are propagated to get a horizontal integrity limit assuming a worst-case undetected single satellite failure ($H_1$ HIL), wherein a system reported HIL is equal to a maximum of $H_0$ HIL and $H_1$ HIL.

2. The aircraft of claim 1, further comprising at least one flight management system (FMS), at least one inertial reference system (IRS), and at least one GNSS antenna, wherein the computing device is a multi-mode receiver (MMR), wherein the MMR receives the GNSS signals from the at least one GNSS antenna, wherein the MMR receives the flight trajectory data from one or more of the at least one FMS, wherein the MMR receives the inertial navigation data from the at least one IRS, wherein one or more of the at least one FMS receives and utilizes the navigation data and the predicted HIL to perform the RNP procedure or the preflight planning procedure.

3. The aircraft of claim 1, further comprising at least one flight management system (FMS), at least one inertial reference system (IRS), and at least one GNSS receiver, wherein the computing device is a data concentrator unit (DCU), wherein the DCU receives the GNSS measurements from the at least one GNSS receiver, wherein the DCU receives the flight trajectory data from one or more of the at least one FMS, wherein the DCU receives the inertial navigation data from the at least one IRS, wherein one or more of the at least one FMS receives and utilizes the navigation data and the predicted HIL to perform the RNP procedure or the preflight planning procedure.

4. The aircraft of claim 1, further comprising at least one flight management system (FMS) and at least one GNSS receiver, wherein the computing device is an inertial reference system (IRS), wherein the IRS receives the GNSS measurements from the at least one GNSS receiver, wherein the IRS generates the inertial navigation data, wherein the IRS receives the flight trajectory data from one or more of the at least one FMS, wherein one or more of the at least one FMS receives and utilizes the navigation data and the predicted HIL to perform the RNP procedure or the preflight planning procedure.

5. The aircraft of claim 1, further comprising at least one flight management system (FMS), at least one inertial reference system (IRS), and at least one GNSS receiver, wherein the computing device receives the GNSS measurements from the at least one GNSS receiver, wherein the computing device receives the flight trajectory data from one or more of the at least one FMS, wherein the computing device receives the inertial navigation data from the at least one IRS, wherein one or more of the at least one FMS receives and utilizes the navigation data and the predicted HIL to perform the RNP procedure or the preflight planning procedure.

6. The aircraft of claim 1, further comprising at least one inertial reference system (IRS) and at least one GNSS receiver, wherein the computing device is a flight management system (FMS), wherein the FMS receives the GNSS measurements from the at least one GNSS receiver, wherein the FMS generates the flight trajectory data, wherein the FMS receives the inertial navigation data from the at least one IRS, wherein the FMS utilizes the navigation data and the predicted HIL to perform the RNP procedure or the preflight planning procedure.

7. The aircraft of claim 1, wherein the at least one processor further utilizes data of nominal aircraft attitude along a planned trajectory to compute the predicted HIL.

8. The aircraft of claim 1, wherein the at least one processor further utilizes data of topography along a planned flight route to compute the predicted HIL.

9. The aircraft of claim 1, wherein the predicted HIL is less than a horizontal alert limit (HAL) even when a receiver autonomous integrity monitoring (RAIM) horizontal protection level (HPL) exceeds the HAL, wherein the predicted HIL being less than the HAL allows the aircraft to perform the RNP procedure or the preflight planning procedure.

10. The aircraft of claim 1, wherein by computing the navigation data and the predicted HIL, the at least one processor is configured to predict coasting capability in real time based on current conditions and a planned flight path.

11. The aircraft of claim 1, wherein the navigation data includes a position estimate, wherein the at least one processor is configured to provide the position estimate and the predicted HIL after GNSS measurements are lost.

12. A system, comprising:
    an aircraft, comprising:
      a flight management system (FMS) comprising a processor; and
      a computing device comprising at least one processor, wherein the at least one processor is configured to:
        utilize inertial navigation data, global navigation satellite system (GNSS) measurements, and flight trajectory data to compute navigation data and a predicted horizontal integrity level (HIL), wherein the HIL is a protection level of a hybrid GNSS-inertial reference system (IRS) navigation filter; and output, to the FMS, the navigation data and the predicted HIL to be used for performance of a required navigation performance (RNP) procedure or a preflight planning procedure, wherein the FMS is configured to utilize the navigation data and the predicted HIL to perform the RNP procedure or the preflight planning procedure, wherein the aircraft is configured to integrity coast in the presence of GNSS outages and receiver autonomous integrity monitoring (RAIM) holes, wherein if the aircraft is integrity coasting, a covariance matrix ($P_0$) and a state (x) of a full filter having zero satellites excluded are computed to get a horizontal integrity limit given a fault-free assumption ($H_0$ HIL) and a position estimate, wherein a covariance matrix ($P_i$) and a state ($x_i$) of 1-satellite-excluded subfilters are propagated to get a horizontal integrity limit assuming a worst-case undetected single satellite failure ($H_1$ HIL), wherein a system reported HIL is equal to a maximum of $H_0$ HIL and $H_1$ HIL.

13. The system of claim 12, wherein the at least one processor further utilizes data of nominal aircraft attitude along a planned trajectory to compute the predicted HIL.

14. The system of claim 12, wherein the at least one processor further utilizes data of topography along a planned flight route to compute the predicted HIL.

15. The system of claim 12, wherein the predicted HIL is less than a horizontal alert limit (HAL) even when a receiver autonomous integrity monitoring (RAIM) horizontal protection level (HPL) exceeds the HAL, wherein the predicted HIL being less than the HAL allows the aircraft to perform the RNP procedure or the preflight planning procedure.

16. The system of claim 12, wherein by computing the navigation data and the predicted HIL, the at least one processor is configured to predict coasting capability in real time based on current conditions and a planned flight path.

17. The system of claim 12, wherein the navigation data includes a position estimate, wherein the at least one processor is configured to provide the position estimate and the predicted HIL after GNSS measurements are lost.

18. A method of operating an aircraft, comprising:
utilizing, by at least one processor of the aircraft, inertial navigation data, global navigation satellite system (GNSS) measurements, and flight trajectory data to compute navigation data and a predicted horizontal integrity level (HIL), wherein the HIL is a protection level of a hybrid GNSS-inertial reference system (IRS) navigation filter;

outputting, by the at least one processor, the navigation data and the predicted HIL; and based on the navigation data and the predicted HIL, performing a required navigation performance (RNP) procedure or a preflight planning procedure, wherein the aircraft is configured to integrity coast in the presence of GNSS outages and receiver autonomous integrity monitoring (RAIM) holes, wherein if the aircraft is integrity coasting, a covariance matrix ($P_0$) and a state (x) of a full filter having zero satellites excluded are computed to get a horizontal integrity limit given a fault-free assumption ($H_0$ HIL) and a position estimate, wherein a covariance matrix ($P_i$) and a state ($x_i$) of 1-satellite-excluded subfilters are propagated to get a horizontal integrity limit assuming a worst-case undetected single satellite failure ($H_1$ HIL), wherein a system reported HIL is equal to a maximum of $H_0$ HIL and $H_1$ HIL.

* * * * *